United States Patent [19]

Thomas et al.

[11] 3,926,799

[45] Dec. 16, 1975

[54] SUPPORT FOR DYNAMIC MEMBRANE

[75] Inventors: David G. Thomas; William R. Mixon; Phil H. Hayes, all of Oak Ridge, Tenn.

[73] Assignee: The United States of America as represented by the Secretary of the Interior, Washington, D.C.

[22] Filed: Sept. 24, 1974

[21] Appl. No.: 508,782

Related U.S. Application Data

[63] Continuation of Ser. No. 383,234, Oct. 3, 1972, abandoned.

[52] U.S. Cl. ............... 210/23; 210/500 M; 427/245
[51] Int. Cl.² .................... B01D 31/00; B01D 13/00
[58] Field of Search ............... 210/23, 321, 500 M; 427/245, 246

[56] References Cited
UNITED STATES PATENTS

| | | | |
|---|---|---|---|
| 3,022,187 | 2/1962 | Eyraup et al. | 210/500 M |
| 3,449,245 | 6/1969 | Johnson et al. | 210/23 |
| 3,462,362 | 8/1969 | Kollsman | 210/23 |
| 3,497,394 | 2/1970 | Berger | 210/510 X |
| 3,743,595 | 7/1973 | Johnson, Jr. | 210/23 |

*Primary Examiner*—Frank A. Spear, Jr.
*Attorney, Agent, or Firm*—William S. Brown; Donald R. Fraser

[57] ABSTRACT

Porous supports for dynamic hyperfiltration membranes are prepared by coating substrates with $ZrO_2$ filter aid prior to insertion in desalination apparatus. The coating is applied by applying a layer of an aqueous slurry of $ZrO_2$ to the substrate, followed by drying and firing the resulting composite.

6 Claims, No Drawings

SUPPORT FOR DYNAMIC MEMBRANE

This is a continuation of application Ser. No. 383,234, filed Oct. 3, 1972, now abandoned.

Large scale application of dynamic hyperfiltration membranes to desalination and pollution problems requires an inexpensive and rugged porous support upon which the membranes can be formed. Although a few commercial sources produce such tubes, frequently a filter aid is added to obtain the narrow range of pore size required for dynamic membrane formation. See e.g., U.S. Pat. No. 3,577,339. Tubes which do not require a filter aid must be made from carefully controlled particle size raw materials in order to obtain the correct pore size in the final product. Thus, the tubes are prohibitively expensive for large installations.

Usually the filter aid is added as a suspension in the feed to the hyperfiltration loop. Not only is this filter aid formation time consuming, but special equipment (valves, pump, etc.) is required to handle the filter aid slurry. Also, if a dynamic membrane formed on the filter aid layer becomes fouled and must be replaced, the filter aid must also be replaced. Such a procedure seriously hinders the operation of a large-scale plant.

Accordingly, it is an object of the present invention to provide a method whereby inexpensive support substrates may be precoated with a filter aid prior to insertion within a desalination plant. This coating must be sufficiently rugged to withstand the handling required during fabrication of tube bundles as well as permitting the removal and replacement of dynamic membranes. A satisfactory method would obviate the need for carefully controlling the raw materials used in the manufacture of a support tubing.

It has now been found, in accordance with the invention, that inexpensive porous substrates may be provided with a durable coating of a filter aid, consisting essentially of zirconium oxide, by applying to the substrate a layer of an aqueous slurry of $ZrO_2$, followed by drying and firing to evaporate the water and form a durable layer of $ZrO_2$ integral with the surface of the substrate. The resulting composites have been found to provide outstanding flux and salt rejection in water desalination processes using dynamically formed membranes.

The porous substrate may be composed of any conventional substrate material such as ceramics, e.g., alumina, silica, silicates, magnesia or other combinations of metal oxides or other materials such as porous metals, carbons, or other porous material of sufficient mechanical strength to withstand a pressure of 50 psig or greater. A nominal porosity of about 10 to 40%, and an average pore size of about 5 to 50 microns in diameter, is usually satisfactory for purposes of the invention. For maximum efficiency the substrate, and consequently the support, will usually be in the form of a tube, the membrane being formed on either the inside or outside of the tube. The support may, however, also be in the form of flat surfaces, spiral-shaped surfaces, surfaces with reentrant contours, surfaces with projections, etc. The method of the invention is, in fact, particularly adapted to coating of irregular surfaces, many of which cannot be uniformly coated with a filter aid by prior art in situ coating methods.

The aqueous slurry of $ZrO_2$ used for coating the substrate consists of about 30 to 60 weight percent $ZrO_2$ dispersed in water. It is prepared simply by the addition of $ZrO_2$ powder to the required amount of water, and stirring or otherwise agitating the mixture to form a uniform dispersion. The $ZrO_2$ powder, from which the slurry is prepared, should have a particle size of about 1.5 to 30 microns to ensure formation of an effective filter aid.

The porous substrate is coated by contacting its surface with the $ZrO_2$-water slurry for a time sufficient to deposit a layer of the $ZrO_2$, when dry, of about 0.005 to 0.05 gm/cm$^2$. The time required will depend on the nature of the substrate, the thickness of the $ZrO_2$ layer that is desired, size of the $ZrO_2$ particles and the concentration of $ZrO_2$ in the slurry, and is best determined experimentally. A time of about 1 to 15 seconds is, however, usually satisfactory.

The coated substrate is then air dried, at ambient temperature, for a period of about 10 to 24 hours to remove most of the water. It is then fired at a temperature of about 900° to 1,400°C for a period of about 1 to 5 hours. This may be accomplished in any conventional apparatus such as an electric furnace. This results in formation of a stable $ZrO_2$ filter aid layer on the porous substrate, on which an efficient dynamic membrane can be formed. In addition, the dynamic membrane may be readily replaced when desired, without replacement of the filter aid.

Although application of a single layer of $ZrO_2$-water slurry, by the above procedure, has generally been found to give good results, application of a second layer following the drying step may provide greater uniformity of the $ZrO_2$ layer. A second layer may be applied on top of the first layer by means of the same procedure, i.e., coating with an aqueous $ZrO_2$ slurry, followed by drying and subsequently firing of the composite.

The composite support of the invention may be used in any conventional hyperfiltration process employing membranes formed dynamically with polyelectrolytes including hydrous oxides and organic or inorganic polymers, or combinations thereof.

The invention will be more specifically illustrated by the following example.

EXAMPLE

The porous substrate in this example consisted of a ceramic tube 0.57 inch O.D., 0.125 inch I.D. and 36 inches long. It had a nominal porosity of about 40 percent and was composed primarily of aluminum oxide, with some cordierite.

One end of the ceramic tube was dipped into melted paraffin for 1 inch, i.e., the length of the tube to be incorporated in the plastic header of a multiple tube hyperfiltration module. The tube was then immersed into a slurry of 15-micron (mean diameter on a weight basis) $ZrO_2$ whose concentration was 1,500 gms/liter. The duration of immersion in the slurry, about 1.0 sec., was adjusted to provide a layer thickness of 0.015 gm/cm$^2$ when dry. The primary purpose of this step was to provide a smooth base coat for the final $ZrO_2$ coat. After air-drying for a period of 20 hours, the tube was dipped into a slurry of 6-micron $ZrO_2$ whose concentration was ~1100 gms/liter. The duration of immersion in the slurry, about 1.0 sec., was adjusted to provide a second layer thickness of ~0.034 gms/cm$^2$ when dry.

After the tube was dry, it was fired in an electric furnace; approximately 10 hours was taken to reach maximum firing temperature of 1,100°C. The maximum temperature was maintained for 3 hours before the furnace was shut off, and the tube was allowed to cool in the furnace before removal. In the firing process, the paraffin burned off the end of the tube to provide a length of uncoated tube for mounting in a hyperfiltration apparatus. When the firing was completed, the two $ZrO_2$ layers had a combined thickness of ~0.006-inch and a combined porosity of 43%.

The thus-prepared composite support was installed in a hyperfiltration module and a hydrous zirconium-polyacrylic acid membrane, having a thickness of less than 0.001-inch, was formed on the outside thereof by means of a process comprising deposition of a hydrous zirconium oxide layer at pH 3 to 4, followed by deposition of a polyacrylic acid layer at a pH of 1.9 to 2.5.

Hyperfiltration efficiency of the supported membrane was tested by circulating a salt solution comprising 0.05 molar sodium chloride at a pH of 6.8 over the supported membrane at a velocity of 15 ft/sec. and a pressure of 1000 psig. It was found that the supported membrane provided a flux of about 100 gfd and a salt rejection of about 90 percent.

We claim:

1. A method for preparation of a composite support for a dynamic hyperfiltration membrane comprising coating a porous substrate with an essentially uniform layer of zirconium oxide by applying to the substrate a layer of an aqueous slurry of zirconium oxide, the particle size of the zirconium oxide being about 1.5 to 30 microns and the concentration of the zirconium oxide in the slurry being about 30 to 60 weight percent; drying at room temperature; and firing at a temperature of 900° to 1400°C to form a durable layer of zirconium oxide on the substrate.

2. The method of claim 1 in which the porous substrate consists of a ceramic tube.

3. The composite support prepared by the method of claim 1.

4. In a process for purifying water by hyperfiltration comprising passing the water, under pressure, over the surface of a hyperfiltration membrane, the improvement comprising using the composite support of claim 3 to support the hyperfiltration membrane.

5. The process of claim 4 in which the hyperfiltration membrane is formed dynamically on the support.

6. The process of claim 5 in which the membrane consists essentially of a combination of hydrous zirconium oxide and polyacrylic acid.

* * * * *